R. BROOKS, Jr.
Spoke-Socket.
No. 69,757. Patented Oct. 15, 1867.
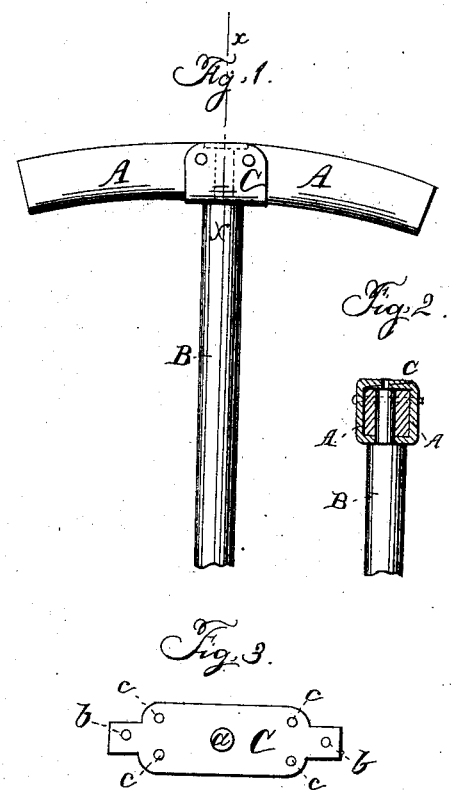

United States Patent Office.

REUBEN BROOKS, JR., OF ROCKPORT, MASSACHUSETTS.

Letters Patent No. 69,757, dated October 15, 1867.

---

IMPROVEMENT IN CARRIAGE-WHEELS.

---

The Schedule referred to in these Letters Patent and making part of the same.

---

TO ALL WHOM IT MAY CONCERN:

Be it known that I, REUBEN BROOKS, Jr., of Rockport, in the county of Essex, and State of Massachusetts, have invented a new and useful Improvement in Carriage-Wheels; and I do hereby declare that the following is a full, clear, and exact description thereof, which will enable others skilled in the art to make and use the same, reference being had to the accompanying drawings, forming part of this specification.

This invention relates to a new and improved method of joining the felloes of carriage or wagon-wheels, whereby the wheel is rendered much more durable than it is when the felloes are joined in the ordinary way; and the invention consists in providing a metallic clamp for the support of the joint at the end of the spoke, as hereinafter described.

Figure 1 represents a portion of the felloe and spoke, with the joint of the felloe formed according to my invention.

Figure 2 is a section of the same through the line $x\,x$.

Figure 3 is a view of the clamp before it is formed or shaped to fit the felloe.

Similar letters of reference indicate corresponding parts.

A represents a section of the felloe of a wheel composed of two pieces joined together on the spoke by my clamp. B is the spoke and C is the clamp. The clamp C is formed of a plate which is cut out of sheet metal, as seen in fig. 3. $a$ is a hole through which the tenon of the spoke passes, the tenon being seen in dotted lines in fig. 1. The clamp is formed to the shape of the felloe, its outside surface conforming to the size and shape of a cross-section of the felloe, so that when the joint is complete the clamp is flush with the surface of the felloe all round, consequently the ends of the pieces of felloe are cut away the thickness of the metal where they enter the clamp, and also so as to enclose one-half of the tenon of the spoke. Fig. 2 shows the form of the clamp as used. The ends of the plate, fig. 3, are brought together and secured by holes $b\,b$, or in any other suitable manner. $c$ represents holes for rivets, by which the clamp and the felloe are secured together.

It will be seen that by this method all dowelling is dispensed with, and its superiority over the common method of making the joint (between the spokes) will be apparent to all.

Having thus described my invention, what I claim as new, and desire to secure by Letters Patent, is—

1. The metal clamp C, constructed as described, from a plate of metal provided with the central hole $a$ for the passage of the tenon of the spoke, the sides of said clamp bent around the joints of the felloes flush with the sides and tread, and secured to the end of the tenon of the spoke by means of the holes $b$ fitting thereon, as herein set forth for the purpose specified.

2. Joining the ends of the felloes of carriage-wheels at the end of a spoke by means of the clamp C, constructed as described, in such a manner that the tenon of the spoke shall pass through the hole $a$ in said clamp, and be firmly secured therein by the pressure of the ends of the felloes, as herein shown and described.

3. Supporting the felloes by means of the shoulder of the spoke bearing against the outside of the plate C, and firmly securing the ends of the felloes by means of rivet-bolts passing through the holes $c\,c$ in said clamp, substantially as described for the purpose specified.

4. The insertion of rivet-bolts in the holes $c\,c$ through a clamp securing the ends of the felloes of carriage-wheels for the purpose of tightening said felloes, substantially as herein shown and described.

REUBEN BROOKS, JR.

Witnesses:
 Jos. MANNING,
 JOHN P. BAKER.